United States Patent
Pulford et al.

(10) Patent No.: US 10,652,192 B1
(45) Date of Patent: *May 12, 2020

(54) METHOD, SYSTEM AND COMPUTER READABLE MEDIUM FOR NOTIFICATION DELIVERY

(71) Applicant: West Corporation, Omaha, NE (US)

(72) Inventors: Gary Douglas Pulford, Lafayette, CO (US); Bruce Pollock, Omaha, NE (US); Ian James Juliano, Omaha, NE (US); James P. Breen, Chicago, IL (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,823

(22) Filed: Apr. 1, 2019

Related U.S. Application Data

(63) Continuation of application No. 15/188,618, filed on Jun. 21, 2016, now Pat. No. 10,250,545, which is a continuation of application No. 14/600,974, filed on Jan. 20, 2015, now Pat. No. 9,372,730, which is a continuation of application No. 11/951,394, filed on Dec. 6, 2007, now Pat. No. 8,949,840.

(51) Int. Cl.
*G06F 9/46* (2006.01)
*H04L 12/58* (2006.01)
*H04W 4/12* (2009.01)
*G06F 9/48* (2006.01)
*H04L 12/24* (2006.01)
*G06F 9/54* (2006.01)

(52) U.S. Cl.
CPC ............ *H04L 51/26* (2013.01); *G06F 9/4887* (2013.01); *G06F 9/546* (2013.01); *H04L 41/5003* (2013.01); *H04L 51/04* (2013.01); *H04L 51/24* (2013.01); *H04W 4/12* (2013.01); *G06F 2209/548* (2013.01)

(58) Field of Classification Search
None
See application file for complete search history.

*Primary Examiner* — Gregory A Kessler

(57) ABSTRACT

In a system, method and computer readable medium for managing message delivery, message delivery jobs are dynamically prioritized into a plurality of priority queues based on a delivery timeframe for each job. A delivery manager controls delivery of the message delivery jobs through a number of delivery channels and ports. A priority manager reviews jobs pending in the queues. If the priority manager determines that a message delivery job will not be completed within its delivery timeframe, the priority manager assigns a higher priority to the message delivery job.

20 Claims, 4 Drawing Sheets

METHOD, SYSTEM AND COMPUTER READABLE MEDIUM FOR NOTIFICATION DELIVERY

CROSS-REFERENCE TO RELATED APPLICATIONS

This application is a continuation from U.S. patent application Ser. No. 15/188,618, filed Jun. 21, 2016, and entitled "METHOD, SYSTEM AND COMPUTER READABLE MEDIUM FOR NOTIFICATION DELIVERY", which is a continuation from U.S. patent application Ser. No. 14/600,974, filed Jan. 20, 2015, and entitled "METHOD, SYSTEM AND COMPUTER READABLE MEDIUM FOR NOTIFICATION DELIVERY", now issued U.S. Pat. No. 9,372,730, which is a continuation from U.S. patent application Ser. No. 11/951,394, filed Dec. 6, 2007, and entitled "METHOD, SYSTEM AND COMPUTER-READABLE MEDIUM FOR MESSAGE NOTIFICATION DELIVERY", now issued U.S. Pat. No. 8,949,840, each of which is incorporated by reference herein in its entirety.

FIELD OF THE INVENTION

This disclosure relates to a method, system and computer readable medium for providing notifications to recipients. In particular, the disclosure relates to providing batch notifications and more particularly batch notifications on behalf of third parties.

BACKGROUND OF THE INVENTION

Currently in the notification market linear prioritization of notifications can result in notifications being delivered after the point of value to the owner of the notification or the recipient of the notification. If limited capacity is available, linear prioritization of message delivery jobs can result in lower priority jobs being prevented from notification distribution due to higher priority jobs continually being placed in front of the lower priority jobs in the distribution queue of the notification platform. Historically, entities would solve this issue by increasing the network capacity of the notification platform. The result of the increasing system capacity to support peak message delivery timelines is excess or unutilized capacity during non-peak hours and therefore decreasing the efficiencies of the solution and increasing the operational costs of the notification system. There is therefore a need for a system, method and computer readable medium providing more efficient utilization of message delivery resources.

SUMMARY OF THE INVENTION

In one embodiment of the disclosure, there is provided a method for message delivery comprising receiving a plurality of message delivery jobs each message delivery job comprising at least one message and at least one message recipient; determining a delivery timeframe for each message delivery job; assigning a priority level to each message delivery job dependent on said delivery timeframe, said priority level being selected from a plurality of priority levels; and processing said message delivery jobs; wherein processing said message delivery jobs comprises: processing at least one message delivery job to cause the at least one message to be sent to the at least one message recipient; and processing at least one message delivery job to assign a higher priority level to the message delivery job to ensure that the notification job is delivered within its respective delivery timeframe.

In one embodiment of the disclosure, there is provided a message delivery system comprising at least one interface; at least one priority manager; and at least one delivery manager; wherein the at least one interface receives a plurality of message delivery jobs, each message delivery job comprising at least one message and at least one message recipient; wherein the at least one priority manager determines a delivery timeframe for each received message delivery job; wherein the at least one priority manager determines a priority level for each message delivery job dependent on said determined delivery timeframe; wherein the at least one delivery manager selects a message delivery job and processes said selected message delivery job to cause delivery of the at least one message to the at least one message recipient; and wherein the priority manager reviews the priority level of at least one message delivery job assigns a higher priority level to the reviewed message delivery job if the message delivery job will not be completed within its respective delivery timeframe.

In one embodiment of the disclosure, there is provided a method for message delivery comprising receiving a plurality of message delivery jobs each message delivery job comprising at least one message and at least one message recipient; determining a delivery timeframe for each message delivery job; assigning each message delivery job to one of a plurality of job queues, each of said plurality of job queues being associated with a delivery timeframe; and processing said job queues; wherein processing a job queue comprises selecting a job in said job queue; determining a number of ports required to ensure that each message of said message delivery job is delivered to its respective recipient within said delivery timeframe; and assigning said determined number of ports to said message delivery job.

In one embodiment of the disclosure, there is provided a computer readable medium comprising instructions executable on at least one processor for receiving a plurality of message delivery jobs each message delivery job comprising at least one message and at least one message recipient; determining a delivery timeframe for each message delivery job; assigning a priority level to each message delivery job dependent on said delivery timeframe, said priority level being selected from a plurality of priority levels; and processing said message delivery jobs; wherein processing said message delivery jobs comprises selecting at least one message delivery job to cause the at least one message to be sent to the at least one message recipient; and processing at least one message delivery job to assign a higher priority level to the message delivery job to ensure that the notification job is delivered within its respective delivery timeframe.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
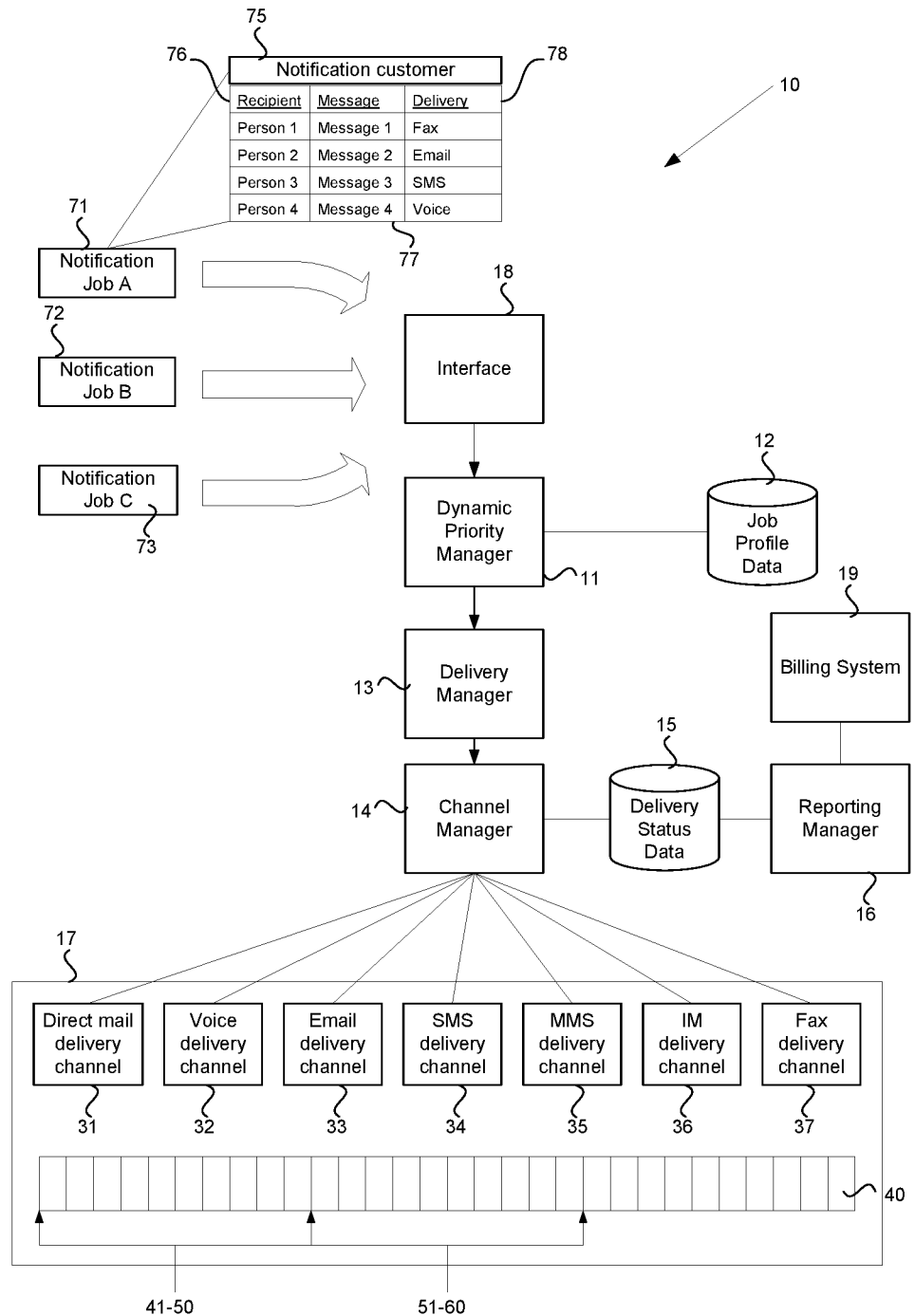
FIG. 1 schematically represents a system for message delivery.

A notification system or notification platform 10 in accordance with an embodiment of the disclosure is illustrated in FIG. 1. The elements of the system 10 include, without limitation, an interface 18, a dynamic priority manager 11, a database 12 storing job profile data, a delivery manager 13, a channel manager 14, a database 15 storing delivery status data, a reporting manager 16 and a billing system 19. The channel manager 14 manages notification delivery through channels 17. Shown are delivery channels for direct mail delivery 31, voice delivery 32, electronic mail (email) 33, Short Messaging Service (SMS) 34, Multimedia Messaging Service (MMS) 35, Instant Messaging (IM) 36 and facsimile delivery 37. The skilled addressee will readily understand that other delivery channels are available and substitution or modification of the delivery channels shown may be made without departing from the scope of the invention in its broadest form.

Each delivery channel may have assigned to it a plurality of delivery ports 40 for providing the relevant notification delivery. For example, ports 41-50 may be configured for electronic mail delivery through email delivery channel 33 while ports 51-60 may be configured, for example, for delivery of facsimile messages through fax delivery channel 37. The channel manager 14 may dynamically reassign delivery ports to optimize the efficiency of notification delivery based on the remaining jobs found in the delivery status data.

The notification platform 10 is able to perform dynamic priority weighting of notification jobs as will be described in greater detail below. Dynamic prioritization ensures that notifications can be delivered within a period of time that maximizes value for both the notification owner and the notification recipient. Intelligent prioritization of notifications can be determined based on multiple factors including the urgency (priority) of the notification, price (value of the notification service based on time to deliver), Acceptable Delivery Window—ADW (window of time a notification has value), Service level agreements and associated penalties, port availability, estimated time to complete all active jobs, and the number of jobs in queue at any point in time. The system can dynamically adjust resources as jobs are added and completed to the queue based on the factors listed above.

Service level agreements can be tailored to customers and stored as records in the job profile database 12. The job profile database 12 can also store information, such as customer preferences, for aiding in determining an acceptable delivery window.

Message delivery jobs contain messages that include content such as voice, text, images, graphics, and animation that are delivered to a recipient over voice and data transport methods including circuit based voice, IP based voice, wireless voice (CDMA, GSM, UMTS), WiFi, WiMAX, email, Instant Message, SMS, PSMS, MMS, PMMS, Fax, mail, http (popup screen), TDD, TDY, etc. A message delivery job, such as job A 71, may include a customer identifier 75, a list of message recipients 76 and a corresponding list of notification messages 77 to be sent. The message delivery job 71 may also include a list of preferred delivery channels 78 for each notification message. Alternatively, the preferred delivery channel may be determined from within the system.

Figure 2:
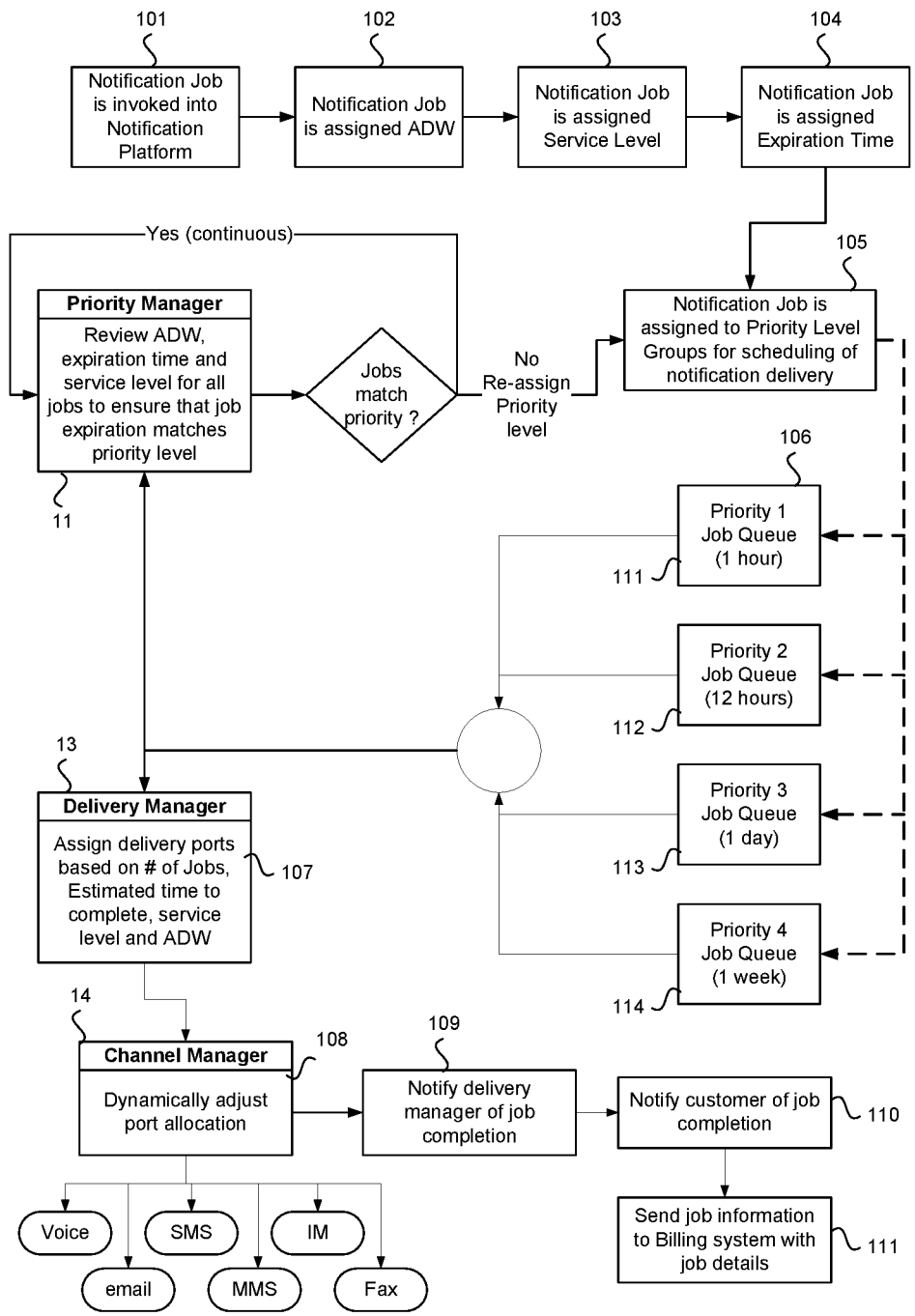
FIG. 2 schematically represents a process flow of the system of FIG. 1.

A process flow for the system 10 will now be described with additional reference to FIG. 2. At a first step 101, message delivery jobs e.g. Job A 71, Job B 72 and Job C 73, are invoked into the platform 10. The message delivery jobs may be internally produced or may be received from a third party, for example, by means of:

customer self administering via a portal that supports interface 18 as a web and/or IVR interface;

customer contacting the message service provider to submit on behalf of the customer through the interface 18;

automated responses triggered by systems, alarms, and sensors.

When a message delivery job is received, the priority manager 11 assigns an Acceptable Delivery Window (ADW) which defines a delivery timeframe by which all messages within the job are to be successfully completed (step 102). The ADW may be determined from a customer identity profile retrieved from the database 12 using a customer identifier 75.

At step 103, the priority manager 11 assigns a service level to the received job. The service level defines the price per message, and service level agreement terms such as penalties, methods of distribution, and guaranteed capacity. In one embodiment, a service level agreement is made between the customer and the notification service provider. The service level agreement may be tailored to the customer or be one of a plurality of standard service level agreements. In one embodiment, the service level may be retrieved from the Job Profile database 12 using an identity of the customer provided in the notification job.

At step 104, the priority manager 11 determines an expiration time for the received job from the ADW and service level. Using the calculated expiration time, the priority manager 11 determines a priority level for the message delivery job (step 105) and then assigns the message delivery job to the appropriate priority queue (step 106). Priority queues are general groupings of message delivery jobs pending delivery within similar timeframes. For example, FIG. 2 shows priority queues 111, 112, 113, 114 for timeframes of within 1 hour, within 12 hours, within one day, and within one week respectively.

The delivery manager 13 selects and processes the job queue containing the highest priority messages for processing (step 107). That is, if the 1 hour queue is empty, the highest priority jobs may have a 12 hour priority level and so the delivery manager selects the 12 hour job queue for processing. The delivery manager 13 assigns port allocations based on the number of jobs in the current priority job queue, estimated time to complete each job, ADW, expiration time, and service level. The delivery manager 14 sends jobs to the channel manager 14 which monitors job status and port utilization for all jobs. If the delivery manager 13 determines that all jobs in the queue cannot be delivered within their respective ADW then the delivery manager 13 will prioritize jobs based on the price and service level to maximize the revenue for the notification provider and/or to minimize the penalties defined within the service level.

When all jobs in the current priority queue are complete or excess capacity is available in the current priority queue then the delivery manager 13 begins processing message delivery jobs from the next lower level priority queue. If at any point the system receives a job from a higher priority queue then the jobs from those higher priority job queues will take precedent over the current jobs.

The channel manager 14 dynamically adjusts port assignments based on the changes requested by the delivery manager 13 (step 108). When a job is complete the channel manager 14 informs the delivery manager 13 (step 109). The channel manager 14 will also initiate a message from the reporting manager 16 to the customer with job details and compliance to the service level (step 110). The channel manager 14 will also initiate a message from the reporting manager 16 to the billing system 19 to be included in the customer invoice complete with job detail records (step 111).

In order to ensure maximum efficiency of the system 10, the channel manager 14 maintains capacity utilization history and alarms the delivery manager 13 if capacity thresholds are exceeded. The delivery manager 13 utilizes the alarms from the channel manager 14, details on active jobs in the priority queues, and total jobs within the priority manager to alarm system administrators if capacity requirements for the system to meet acceptable delivery windows and service levels are exceeded. The channel manager 14 is also able to inform the delivery manager 13 if capacity utilization is below a minimum threshold so the system administrators can reduce excess capacity.

While the delivery manager 13 is processing the message delivery jobs of the highest priority level, the priority manager 11 provides continuous review and validation of job prioritization of the remaining jobs based on the acceptable delivery window, service level, and delivery timeframe to ensure jobs match their current priority level. If the remaining time for any job expiration is smaller than the priority threshold set for the current job queue then the priority manager 11 reassigns the job to the appropriate higher priority job queue.

Figure 3:
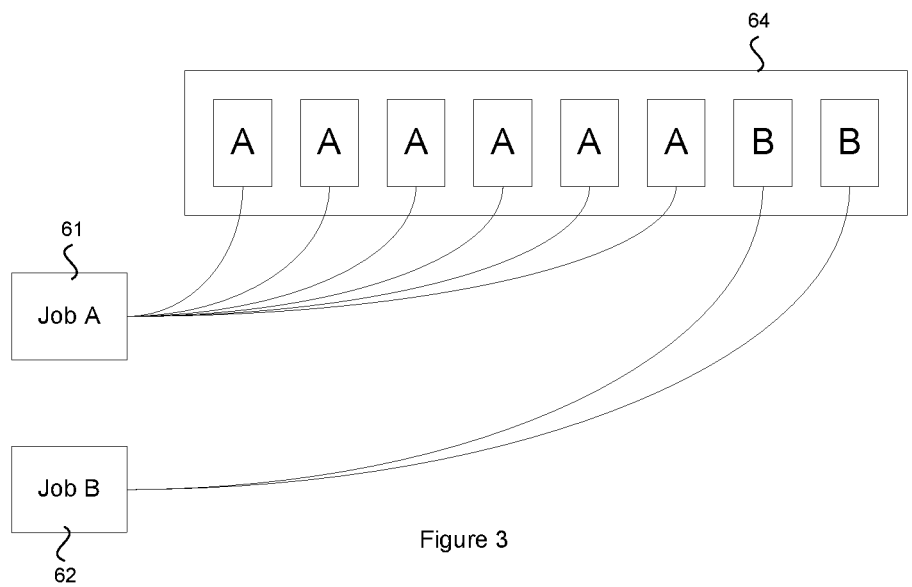
FIGS. 3 and 4 schematically represent a dynamic port assignment.
Figure 4:
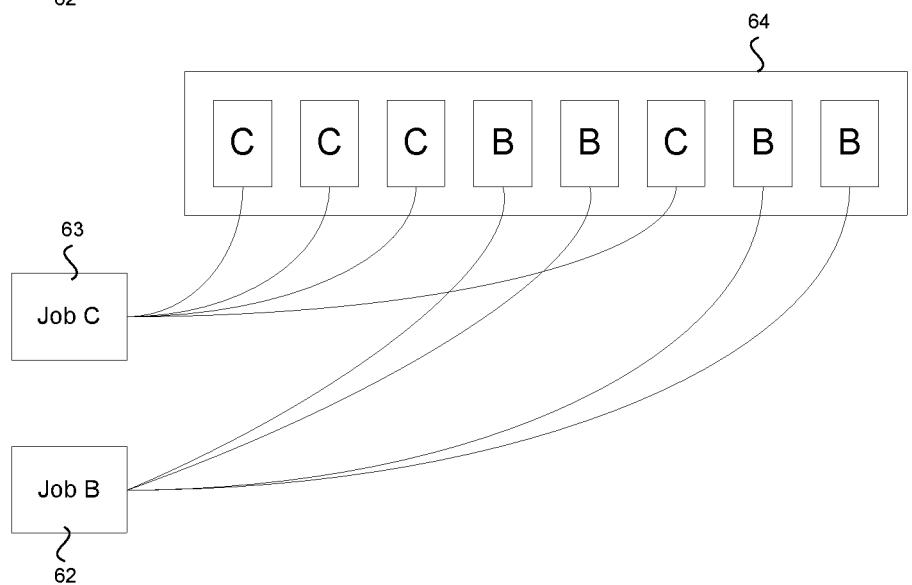

The system 10 allows port utilization to dynamically adjust to the active jobs based on the expiration of the acceptable delivery window. For example, as shown in FIG. 3 if two jobs 61, 62 in the queue have the same priority and the acceptable delivery window of "Job A" 61 will expire in 10 minutes and the acceptable delivery window for "Job B" 62 expires in 30 minutes then 75% of the available ports may be assigned to "Job A" and 25% of the ports may be assigned to "Job B" such that both jobs will be completed within their respective acceptable delivery window. Port assignment will also dynamically adjust based on estimated time to complete both jobs within the acceptable delivery window. Once "Job A" has completed (FIG. 4), some or all of the ports made available can be assigned to processing "Job B" faster. Alternatively, some or all of the ports can be assigned to the next available message delivery job, "Job C" 63.

The prioritization of message delivery jobs may also increase dynamically as the acceptable delivery window expiration remaining on a job reaches a higher priority threshold. For example, if "Job C" has a lower priority than "Job D" then "Job D" will be prioritized before "Job C". However, if the remaining acceptable delivery window for "Job C" becomes shorter than the remaining acceptable delivery window for "Job D", then "Job C" will be dynamically reprioritized higher than "Job D" This ensures that lower priority jobs will not be starved in the priority queues due to the addition of higher priority jobs as seen in linear prioritization models.

The priority manager 11 and delivery manager 13 together continually and dynamically reassign resources to message delivery jobs as jobs are completed and new jobs are added to the priority queues. The message delivery jobs are processed based on the assigned priority and all jobs of higher priority will be completed prior to the delivery of lower priority jobs.

An advantage of the system 10 is that capacity utilization can increase by adjusting notification distribution based on maximizing the network utilization through the adoption of acceptable delivery window expirations. Tiered or premium pricing models can be established for different levels of acceptable delivery windows. The customer can select urgency, with message delivery jobs received at a higher urgency attracting a higher price.

By dynamically monitoring the priority queues, the queue manager is able to ensure that system resources are utilized most efficiently to deliver notifications on time especially during periods of high capacity. The system is therefore able to provide higher delivery efficiency from a smaller amount of available computing power than an equivalent linear prioritization system.

Figure 5:
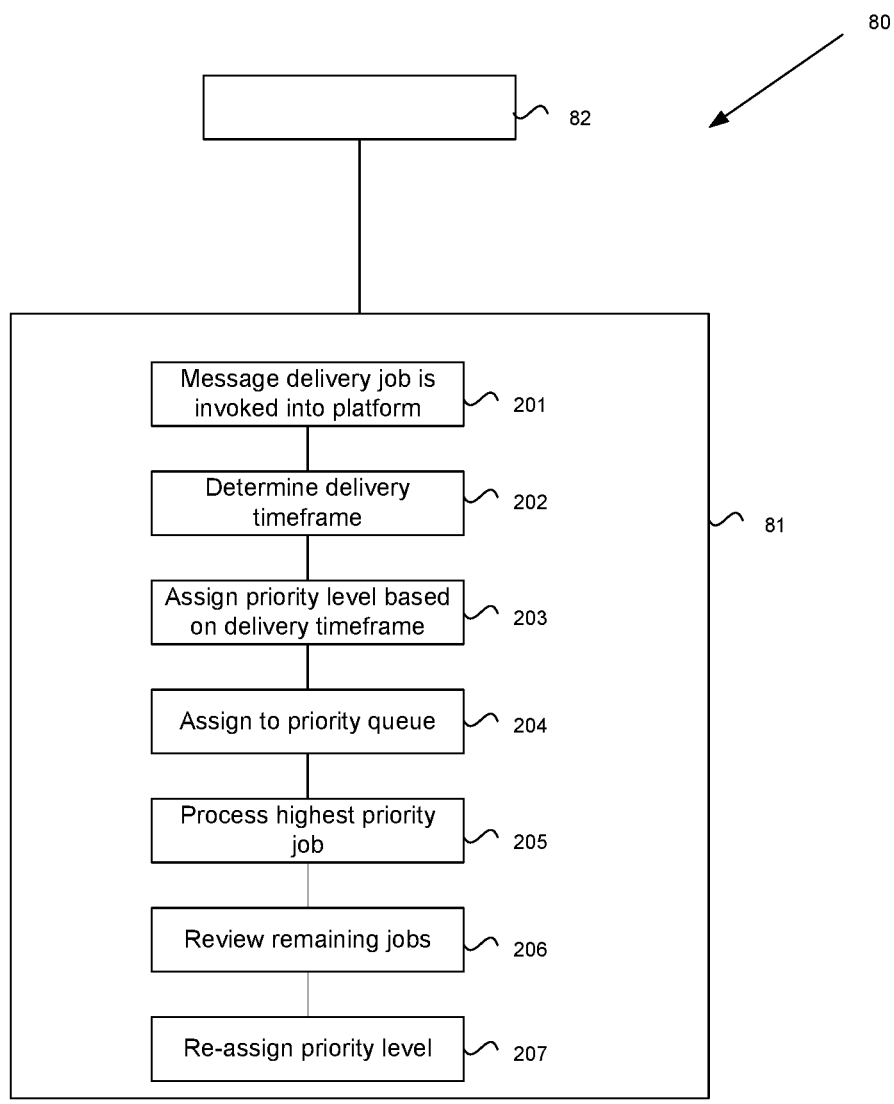
FIG. 5 schematically represents a processor executing an instruction set.

While the interface 18, dynamic priority manager 11, delivery manager 13, channel manager 14, reporting manager 16 and billing manager 19 have been described and illustrated as individual components within the system 10, their functionality may be performed collectively, for example by a computer system shown in FIG. 5, having at least one processor 81 in operative association with at least one memory 82. The computer system 80 may also be operatively associated with the job profile database 12 and the delivery status database 15. The processor 81 may be a single processor or may be representative of multiple or distributed processors. Similarly, the memory 82 may be a single memory or may be representative of multiple or distributed memories.

The processor 81 may execute a set of instructions, which may be stored in memory 82. A method embodied in the instruction set will now be described with reference to the processor 81 of FIG. 5.

At step 201, the processor receives a message delivery job. A delivery timeframe is determined for the message delivery job (step 202) and then a priority level is assigned to the message delivery job (step 203). Once the priority level is assigned, the message delivery job may be assigned to a priority queue (step 204). The received message delivery jobs may be stored in memory 82 awaiting processing.

The processor determines the highest priority job available and processes the job to cause delivery of the messages of the job to the appropriate recipients (step 205). While the messages of the highest priority job are being delivered, the processor also reviews the priority level and delivery timeframes of the other remaining jobs (step 206). If the processor determines that a message delivery job will not be completed within its delivery timeframe, the processor re-assigns the message delivery job to a higher priority level (step 207).

In both a linear prioritization system and in the dynamic prioritization system presently disclosed, it may not be possible to process all notification jobs prior to their respective expiration times during periods of highest demand. The dynamic prioritization system has advantage in these conditions in that the dynamic prioritization system is able to process the jobs in order to maximize the value to both the recipient and the service provider, for example by processing the jobs to minimize any penalty fees incurred.

An application of the system 10 is in providing support to a practice management system. In a typical service industry such as a medical practice, legal firm or similar, a customer, e.g. patient or client, may receive a service, at which time the customer is provided with a bill for services rendered. That customer may have an option of immediately paying for the services. However, if the customer does not immediately pay the bill, the details of the bill are entered as accounts receivable of an accounting system. The present method of notifying and collecting on accounts receivable is a manual process. The service practice may track billing and if a customer is past due, they may send a notification via mail or phone the customer.

The system 10 can interrogate a practice management system to receive a list of customers having an overdue debt. Using the system 10, reminder messages can be sent to each of the customers on the notification list. The system 10 can thus provide a system by which reminders to customers can be automatically generated and delivered, thereby removing the administrative task of issuing reminders on accounts receivables from the responsibility of the practice manager.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
    assigning, by a processor, each message of at least one delivery job to one of a plurality of job queues, each of said plurality of job queues being associated with a delivery timeframe;
    determining, by the processor, a number of ports required to ensure that each message of said message delivery job is delivered to its respective recipient within said delivery timeframe; and
    wherein the determining of the number of ports required is based on a number of jobs in the job queue and an estimated time to complete each job.

2. The method of claim 1, wherein each message delivery job comprises at least one message and at least one message recipient.

3. The method of claim 1, comprising determining, by the processor, the delivery timeframe for the message delivery job.

4. The method of claim 1, comprising determining, by the processor, whether a message delivery job in said job queue will be completed within its respective delivery timeframe.

5. The method of claim 4, comprising reassigning, by the processor, said message delivery job to a higher priority job queue upon determining that said message delivery job will not be completed within its respective delivery timeframe.

6. The method of claim 1, comprising receiving, by the processor, a further message delivery job.

7. The method of claim 6, comprising assigning, by the processor, said further message delivery job to a priority queue having a higher priority than said selected message delivery job.

8. The method of claim 7, comprising re-assigning, by the processor, one or more ports assigned to said selected message delivery job to said further message delivery job.

9. A non-transitory computer-readable medium comprising instructions that, when read by a processor, cause the processor to perform:
    assigning each message of at least one delivery job to one of a plurality of job queues, each of said plurality of job queues being associated with a delivery timeframe;
    determining a number of ports required to ensure that each message of said message delivery job is delivered to its respective recipient within said delivery timeframe; and
    wherein the determining of the number of ports required is based on a number of jobs in the job queue and an estimated time to complete each job.

10. The non-transitory computer-readable medium of claim 9, wherein each message delivery job comprises at least one message and at least one message recipient.

11. The non-transitory computer-readable medium of claim 9, comprising instructions that, when read by the processor, cause the processor to perform determining the delivery timeframe for the message delivery job.

12. The non-transitory computer-readable medium of claim 9, comprising instructions that, when read by the processor, cause the processor to perform determining whether a message delivery job in said job queue will be completed within its respective delivery timeframe.

13. The non-transitory computer-readable medium of claim 12, comprising instructions that, when read by the processor, cause the processor to perform reassigning said message delivery job to a higher priority job queue upon determining that said message delivery job will not be completed within its respective delivery timeframe.

14. The non-transitory computer-readable medium of claim 9, comprising instructions that, when read by the processor, cause the processor to perform receiving a further message delivery job.

15. The non-transitory computer-readable medium of claim 14, comprising instructions that, when read by the processor, cause the processor to perform assigning said further message delivery job to a priority queue having a higher priority than said selected message delivery job.

16. The non-transitory computer-readable medium of claim 15, comprising instructions that, when read by the processor, cause the processor to perform re-assigning one or more ports assigned to said selected message delivery job to said further message delivery job.

17. A system, comprising:
    a processor; and
    memory;
    wherein the processor and the memory are communicably coupled;
    wherein the processor:
    assigns each message of at least one delivery job to one of a plurality of job queues, each of said plurality of job queues being associated with a delivery timeframe;
    determines a number of ports required to ensure that each message of said message delivery job is delivered to its respective recipient within said delivery timeframe;

wherein the number of ports required being determined is based on a number of jobs in the job queue and an estimated time to complete each job.

18. The system of claim 17, wherein each message delivery job comprises at least one message and at least one message recipient.

19. The system of claim 17, wherein the processor determines the delivery timeframe for the message delivery job.

20. The system of claim 17 wherein the processor determines whether a message delivery job in said job queue will be completed within its respective delivery timeframe.

\* \* \* \* \*